(12) United States Patent
Kawabe et al.

(10) Patent No.: US 10,107,179 B2
(45) Date of Patent: Oct. 23, 2018

(54) ENGINE CONTROL DEVICE

(71) Applicant: MITSUBISHI JIDOSHA KOGYO KABUSHIKI KAISHA, Tokyo (JP)

(72) Inventors: Takashi Kawabe, Tokyo (JP); Koji Hata, Tokyo (JP); Fumiaki Hiraishi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 14/889,639

(22) PCT Filed: Mar. 6, 2014

(86) PCT No.: PCT/JP2014/055763
§ 371 (c)(1),
(2) Date: Nov. 6, 2015

(87) PCT Pub. No.: WO2014/208136
PCT Pub. Date: Dec. 31, 2014

(65) Prior Publication Data
US 2016/0084150 A1 Mar. 24, 2016

(30) Foreign Application Priority Data
Jun. 28, 2013 (JP) .................................. 2013-136571

(51) Int. Cl.
*F02B 33/40* (2006.01)
*F02B 75/12* (2006.01)
(Continued)

(52) U.S. Cl.
CPC .............. *F02B 33/40* (2013.01); *F01L 1/344* (2013.01); *F02B 75/12* (2013.01);
(Continued)

(58) Field of Classification Search
CPC .......... F02B 33/40; F02B 75/12; F02B 37/18; F02B 2075/125; F02B 25/145;
(Continued)

(56) References Cited

U.S. PATENT DOCUMENTS 4,305,352 A * 12/1981 Oshima ................... F01L 1/352
123/146.5 A
4,958,606 A * 9/1990 Hitomi .................... F02B 29/08
123/316

(Continued)

FOREIGN PATENT DOCUMENTS

| CN | 101171411 A | 4/2008 |
| JP | 4-237854 A | 8/1992 |

(Continued)

OTHER PUBLICATIONS

Takahiro JP2006348865 Machine Translation and Original.*
Takahiro JP2006348865 Drawings and Original.*

*Primary Examiner* — Hung Q Nguyen
*Assistant Examiner* — Brian P Monahon
(74) *Attorney, Agent, or Firm* — Birch, Stewart, Kolasch & Birch, LLP

(57) ABSTRACT

An engine control device (1) having a supercharger (30) includes an injection controller (3) that controls injections of fuel through a cylinder injection valve (11) and through a port injection valve (12), based on a rotation speed Ne of an engine (10), and a variable valve controller (5) that controls a variable valve actuating mechanism (40) based on the rotation speed Ne. The variable valve controller (5) provides a valve overlap period in a first rotation speed region, and shortens the valve overlap period in a second rotation speed region of greater rotation speeds Ne than in the first rotation speed region. The injection controller (3), in the period during which the rotation speed is shifting from the first rotation speed region to the second rotation speed region, (Continued)

carries out a cylinder injection and a port injection, and advances timing for injecting the fuel through the port injection valve (12).

18 Claims, 9 Drawing Sheets

(51) Int. Cl.
| | |
|---|---|
| *F02B 25/14* | (2006.01) |
| *F02B 37/18* | (2006.01) |
| *F02D 41/30* | (2006.01) |
| *F02D 41/34* | (2006.01) |
| *F02D 13/02* | (2006.01) |
| *F02D 23/02* | (2006.01) |
| *F02D 41/00* | (2006.01) |
| *F01L 1/344* | (2006.01) |
| *F02D 41/38* | (2006.01) |

(52) U.S. Cl.
CPC ..... *F02D 13/0207* (2013.01); *F02D 13/0261* (2013.01); *F02D 23/02* (2013.01); *F02D 41/3094* (2013.01); *F02D 41/345* (2013.01); *F02B 25/145* (2013.01); *F02B 37/18* (2013.01); *F02B 2075/125* (2013.01); *F02D 2041/001* (2013.01); *F02D 2041/389* (2013.01); *F02D 2200/101* (2013.01); *Y02T 10/123* (2013.01); *Y02T 10/144* (2013.01); *Y02T 10/18* (2013.01); *Y02T 10/44* (2013.01)

(58) Field of Classification Search
CPC .. F01L 1/344; F02D 13/0261; F02D 13/0207; F02D 41/3094; F02D 41/345; F02D 23/02; F02D 2200/101; F02D 2041/389; F02D 2041/001; Y02T 10/123; Y02T 10/144; Y02T 10/18; Y02T 10/44
See application file for complete search history.

(56) References Cited

U.S. PATENT DOCUMENTS

| | | | | |
|---|---|---|---|---|
| 5,133,310 | A * | 7/1992 | Hitomi | F01L 1/34406 |
| | | | | 123/90.15 |
| 5,875,743 | A * | 3/1999 | Dickey | F02B 1/12 |
| | | | | 123/25 C |
| 6,039,026 | A * | 3/2000 | Shiraishi | F01L 9/04 |
| | | | | 123/345 |
| 9,353,697 | B2 | 5/2016 | Kawabe et al. | |
| 2001/0027776 | A1* | 10/2001 | Amou | F02D 41/3094 |
| | | | | 123/478 |
| 2001/0035159 | A1* | 11/2001 | Tsunooka | B60T 13/52 |
| | | | | 123/399 |
| 2002/0112692 | A1* | 8/2002 | Abo | F02B 17/005 |
| | | | | 123/295 |
| 2002/0148436 | A1* | 10/2002 | Kawagoe | F02B 5/02 |
| | | | | 123/305 |
| 2003/0029401 | A1* | 2/2003 | Nishikawa | F01L 1/022 |
| | | | | 123/90.17 |
| 2003/0056752 | A1* | 3/2003 | Sukegawa | F02B 1/12 |
| | | | | 123/305 |
| 2003/0164163 | A1* | 9/2003 | Lei | F02M 26/01 |
| | | | | 123/568.14 |
| 2005/0109319 | A1* | 5/2005 | Oda | F02D 19/08 |
| | | | | 123/431 |
| 2006/0021595 | A1* | 2/2006 | Miyashita | F02P 5/1502 |
| | | | | 123/299 |
| 2006/0060162 | A1* | 3/2006 | Fukui | F02D 41/062 |
| | | | | 123/179.16 |
| 2007/0144480 | A1* | 6/2007 | Herweg | F02D 41/3035 |
| | | | | 123/295 |
| 2009/0070014 | A1 | 3/2009 | Miyashita | |
| 2009/0099756 | A1* | 4/2009 | Demura | F02D 41/064 |
| | | | | 701/103 |
| 2009/0107142 | A1* | 4/2009 | Russell | F02B 33/40 |
| | | | | 60/608 |
| 2009/0217905 | A1* | 9/2009 | Tanaka | F02B 23/0669 |
| | | | | 123/276 |
| 2009/0241895 | A1* | 10/2009 | Hedman | F02B 47/02 |
| | | | | 123/25 C |
| 2009/0276142 | A1* | 11/2009 | Leone | F02D 13/0215 |
| | | | | 701/103 |
| 2011/0106410 | A1* | 5/2011 | Yoshino | F02D 13/0226 |
| | | | | 701/103 |
| 2011/0180035 | A1* | 7/2011 | Durrett | F02B 17/005 |
| | | | | 123/295 |
| 2014/0216414 | A1 | 8/2014 | Kawabe et al. | |
| 2014/0230792 | A1 | 8/2014 | Kawabe et al. | |
| 2014/0331651 | A1 | 11/2014 | Nishikiori | |

FOREIGN PATENT DOCUMENTS

| | | | | |
|---|---|---|---|---|
| JP | 5-86942 | A | 4/1993 | |
| JP | 7-151006 | A | 6/1995 | |
| JP | 2001020837 | A * | 1/2001 | ........ F02D 41/3094 |
| JP | 2002-266686 | A | 9/2002 | |
| JP | 2006-46133 | A | 2/2006 | |
| JP | 2006-194096 | A | 7/2006 | |
| JP | 2006-322335 | A | 11/2006 | |
| JP | 2006-348799 | A | 12/2006 | |
| JP | 2006-348865 | A | 12/2006 | |
| JP | 2006348865 | A * | 12/2006 | ........ F02D 41/3094 |
| JP | 2008-14198 | A | 1/2008 | |
| WO | WO 2013/073345 | A1 | 5/2013 | |
| WO | WO 2013/073346 | A1 | 5/2013 | |
| WO | WO 2013/080362 | A1 | 6/2013 | |

\* cited by examiner

ENGINE CONTROL DEVICE

TECHNICAL FIELD

The present invention relates to an engine control device for an engine including a cylinder injection valve for injecting a fuel directly into a cylinder, and a port injection valve for injecting the fuel into an intake port.

TECHNICAL FIELD

Conventionally, engines with a dual fuel injection mode have been proposed, which combine a cylinder injection in which feel is injected directly into a cylinder from a cylinder injection valve and a port injection in which the fuel is injected into an intake port from a port injection valve. Seen engines employ a homogeneous combustion to combust fuel-air mixture in a homogenous concentration distribution the inside a cylinder, and a stratified charge combustion to combust a fuel-air mixture in a high concentration, distributed ununiformly and forming a stratum in the vicinity of a spark plug. Typically, fuel injections are controlled such that a port injection is carried out primarily during the homogeneous combustion, whereas a cylinder injection is carried out primarily during the stratified charge combustion.

As an example, Patent Document 1 discloses an engine which produces a stratified charge combustion by a cylinder injection under a lower load, whereas producing a homogeneous combustion by a port injection under a higher load. This engine initiates the cylinder injection during an intake stroke when the load becomes lower than the predetermined load for initiating the port injection, thereby ensuring that fuel sufficient for the combustion with the cylinder injection is supplied, even when some fuel supplied in the port injection adheres the inner wall of an intake pipe.

RELATED ART DOCUMENT

Patent Document

Patent Document 1: Japanese Patent Laid-open Publication No. Hei 4-237854

SUMMARY OF INVENTION

Problem to be Solved by Invention

Some of engines employing a combination of cylinder and port injections provide a valve overlap period during which the duration of an intake valve opening overlaps with the duration of an exhaust valve opening, for the purpose of improving the scavenging efficiency of the combustion gases and the volumetric efficiency of the intake air. Particularly in engines provided with a supercharger in the intake and exhaust systems, longer valve overlap periods can improve the volumetric efficiency, resulting in increased engine outputs. For extending those valve overlap periods, techniques have been developed for varying open/close timings of intake and exhaust valves in an engine, thereby adjusting the valve overlap periods depending on parameters, such as the engine load.

A longer valve overlap period, however, often induces a phenomenon, known as blow-by, in which air (fuel-air mixture) from an intake path directly enters an exhaust path. Such blow-by may incur reductions in the engine output and the exhaust performance, since fuel supplied in a port injection passes through the cylinder and flows toward the exhaust path. Blow-by tends to take place when the intake air is supercharged by a supercharger, particularly when the engine operates at low rotation speeds.

Accordingly, in an engine employing a combination of cylinder and port injections, which is provided with a supercharger, and is further provided with a variable valve actuating mechanism, it is desired to optimise respective fuel injection timings, fuel injection ratios, and valve overlap periods, for taking full advantage of the two injection schemes, as well as appropriately carrying out fuel injections for addressing the issue of blow-by during valve overlap periods.

The present embodiment was conceived of in light of the above issues, and an object thereof is to provide an engine control device fox an engine employing a combination of cylinder and port injections, which suppresses blow-by and takes advantage of the two injection schemes. The object is not limited to the aforementioned one, and provision of advantages and effects that are achievable by configurations described in the following Modes for Carrying out the Invention, but are not realized with conventional techniques, are also regarded as other objects of the present embodiment.

Solutions to Problem (1) An engine control device disclosed herein is an engine control device for an engine provided with a supercharger, the engine including a cylinder injection valve for injecting a fuel into a cylinder in the engine; a port injection valve for injecting the fuel into an intake port of the cylinder; and a variable valve actuating mechanism that varies open/close timing of at least one of an intake valve and an exhaust valve of the engine, the engine control device including: an injection controller that controls injections of the fuel through the cylinder injection valve and through the port injection valve, on the basis of a rotation speed of the engine; and a variable valve controller that controls the variable valve actuating mechanism on the basis of the rotation speed.

The variable valve controller provides a valve overlap period for opening both the intake valve and the exhaust valve, in a first rotation speed region, whereas shortening the valve overlap period in a second rotation speed region of greater rotation speeds than in the first rotation speed region, and the injection controller, in a period during which the rotation speed is shifting from the first rotation speed region to the second rotation speed region, causes the fuel to be injected through the cylinder injection valve and through the port injection valve, and advances timing for injecting the fuel through the port injection valve.

Specifically, the injection controller carries out the fuel injection through the cylinder injection valve and the fuel injection through the port injection valve in the first rotation speed region and the second rotation speed region, and advances the timing for injecting the fuel through the port injection valve while the rotation speed is shifting from the first rotation speed region to the second rotation speed region.

With regard to the regions related to the rotation speed of the engine, the term "boundary speed region" is defined herein. The boundary speed region is defined as the region of rotation speeds including the boundary rotation speed between the first rotation speed region and the second rotation speed region, or the rotation speed region (gap) interposed between the first and second rotation speed regions. Additionally, any rotation speeds lower than the first rotation speed region and any rotation speeds higher than the second rotation speed region, are not included in the boundary speed region.

The above-described expression "the rotation speed is shifting" refers to the situation where the rotation speed of the engine fails within the boundary speed region. Accordingly, the expression "the rotation speed is shifting" as used therein does net always refer to merely the situation where the rotation speed of the engine is changing from the first rotation speed region to the second rotation speed region.

Preferably, the second rotation speed region is included within the boundary speed region. Preferably, the lower limit of the first rotation speed region is out of the boundary speed region, whereas the upper limit of the first rotation speed region is within the boundary speed region.

(2) Preferably, the injection controller advances the timing for injecting the fuel through the port injection valve further, as the rotation speed increases. Stated differently, the injection controller preferably retards the timing for injecting the fuel through the port injection valve further, as the rotation speed decreases. The term "the timing for injecting the fuel through the port injection valve" refers to the time during which the fuel is being injected. Accordingly, the injection controller preferably advances the tires for initiating to a fuel injection through the port injection valve further, as the rotation speed increases.

(3) Preferably, the injection controller increases a ratio of an amount of the fuel to be injected through the port injection valve, as the rotation speed increases.

(4) Preferably, the injection controller sets, when causing the fuel to be injected through the port injection valve, a ratio of the amount of the fuel to be injected through the port injection valve to an amount of the fuel to be injected through the cylinder injection valve, to 1 or less.

(5) Preferably, the injection controller causes the fuel to be injected only through the cylinder injection valve, in a low rotation speed region where the rotation speed is within the first rotation speed region and is equal to or smaller than a predetermined rotation speed.

(6) Preferably, in the first rotation speed region, the injection controller causes the fuel to be injected through the cylinder injection valve separately during an intake stroke and during a compression stroke.

(7) Preferably, the engine provided with the supercharger includes an exhaust turbine that is provided in an exhaust path of the engine, and is rotatable by an exhaust stream; and an intake compressor that is provided in an intake path of the engine, and is rotatable with a rotation of the exhaust turbine by being coupled to the exhaust turbine. Preferably, the engine further includes a supercharging pressure adjustment valve that is provided in the exhaust path, and is switchable between a closed state to supply the exhaust stream to the exhaust turbine, and an open state to exhaust the exhaust stream, bypassing the exhaust turbine. In this configuration, when the supercharging pressure adjustment valve is in the closed state, the variable valve controller preferably provides the valve overlap period for opening both the intake valve and the exhaust valve in the first rotation speed region, whereas shortening the valve overlap period in the second rotation speed region of greater rotation speeds than in the first rotation speed region, and the injection controller, in the period during which the rotation speed is shifting from the first rotation speed region to the second rotation speed region, preferably causes the fuel to be injected through the cylinder injection valve and through the port injection valve, and advances timing for injecting the fuel through the port injection valve.

Advantageous Effects of Invention

In accordance with this engine control device, it is possible to make use of the advantage of the cylinder injection and the advantage of the port injection, suppressing blow-by during the valve overlap period, enabling both provision of a higher output and provision of an excellent exhaust performance.

MODE FOR CARRYING OUT THE INVENTION

Hereinafter, an embodiment will be described with reference to the drawings. It is noted that the embodiment described below is merely exemplary, and it is not intended to exclude various modifications and applications of the techniques that are not explicitly described in the following embodiment.

[1. Apparatus Configuration]
[1-1. Engine]

Figure 1:
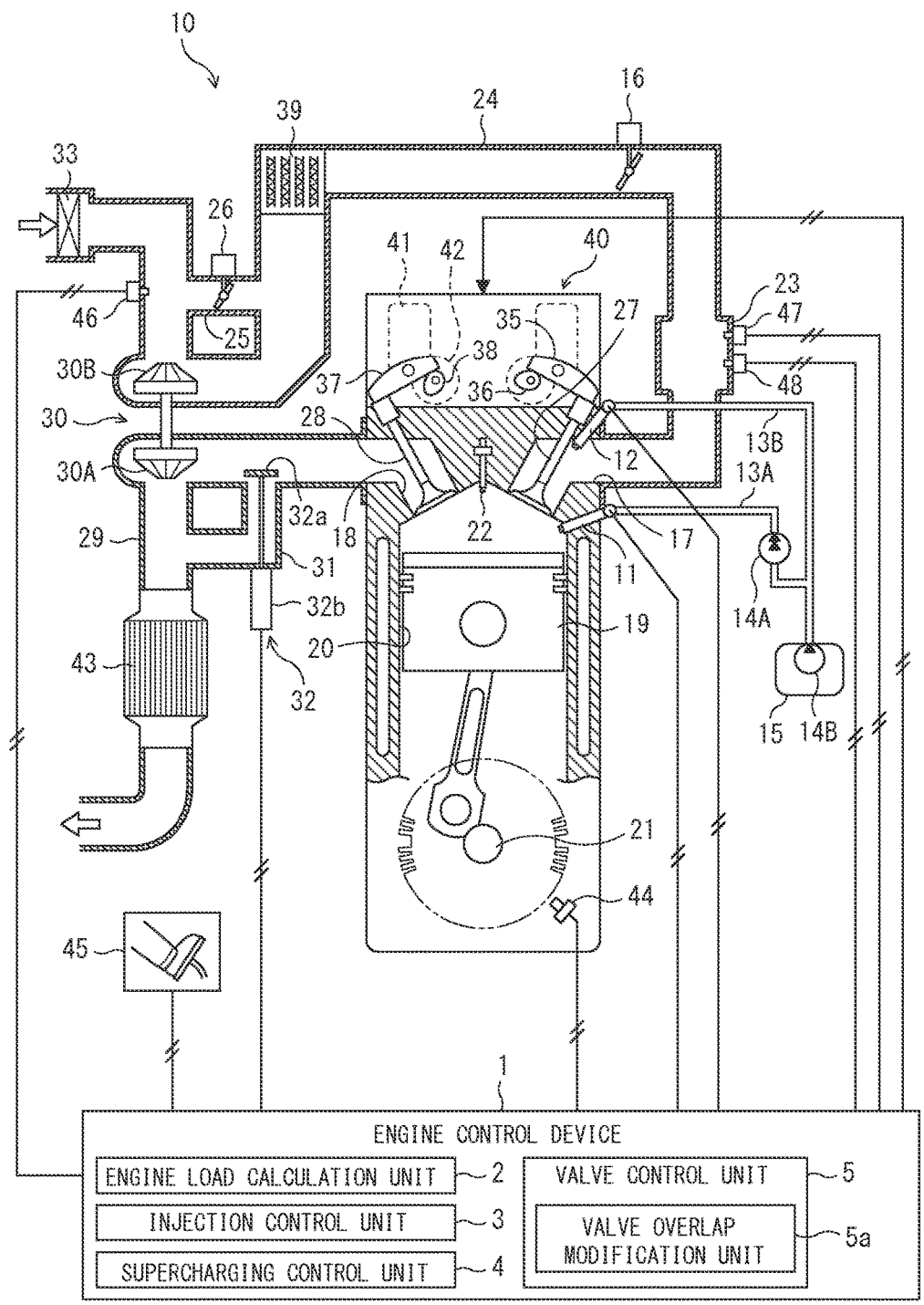
FIG. 1 is a diagram exemplifying a block configuration of an engine control device in accordance with one embodiment, and a configuration of an engine to which this control device is applied.

An engine control device of the present embodiment is applied to a gasoline engine 10 (hereinafter, briefly referred to as the "engine 10" that is provided in a vehicle shown in FIG. 1. The engine 10 is a four-stroke cycle engine that is provided with a fuel injection oysters employing a combination of a port injection and a cylinder injection, and a supercharging system utilizing the exhaust pressure. FIG. 1 shows one of multiple cylinders 20 provided in the multi-cylinder engine 10. The cylinder 20 is provided with a piston 19 so as to be slidable therein, and the reciprocating motion by the piston 19 is converted into a rotational motion of a crank shaft 21 via a connecting rod.

At the top of each cylinder 20, an intake port 17 and an exhaust port 18 are provided. An intake valve 27 is provided to an opening of the intake port 17, and an exhaust valve 28 is provided to an opening of the exhaust port 18. Between the intake port 17 and the exhaust port 18, a spark plug 22 is provided such that the tip of the spark plug 22 protrudes toward a corporation chamber. The timing when to fire the spark plug 22 is controlled by an engine control device 1, which will be described later.

The upper ends of the intake valve 27 and the exhaust valve 28 are connected to rocker arms 35 and 37 in a variable valve actuating mechanism 40, respectively, and are independently reciprocated vertically. In response to respective swing motions of the rocker arms 35 and 37. To the other ends of the rocker arms 35 and 37, cams 36 and 38 pivoted by respective cam shafts are provided, respectively. The swing patterns of the rocker arms 35 and 37 are defined by the shapes (can profiles) of the cams 36 and 38. Via the variable valve actuating mechanism 40, the valve lifts and valve timings of the intake valve 27 and the exhaust valve 28 are controlled by the engine control device 1.

[1-2. Fuel Injection System]

As injectors for supplying fuel to the cylinders 20, a cylinder injection valve (direct injection injector) 11 for injecting the fuel directly into the cylinder 20 and a port injection valve (port injection injector) 12 for injecting the fuel into the intake port 17, are provided. Two types of fuel infection are selected or combined, according to the operating states of the engine 10, to produce a homogeneous combustion to combust fuel-air mixture in a homogenous concentration distribution inside the cylinder 20, and a stratified charge combustion to combust a fuel-air mixture in a high concentration distributed ununiformly and forming a stratum in the vicinity of the spark plug 22.

The port injection is carried out primarily during the homogeneous combustion, whereas the cylinder injection is carried out primarily during the stratified charge combustion. Note that, however, while the fuel is being injected from the cylinder injection valve 11, it is possible to produce the homogeneous combustion. The homogeneous combustion produced by the cylinder injection often provides an increase in the volumetric efficiency since latent heat is absorbed when the fuel evaporates in the cylinder 20. The drop in the combustion temperature also helps to suppress knocks.

The fuel injected from the cylinder injection valve 11 is guided by a stratified air flow generated in the cylinder 20, for example, to the vicinity of the spark plug 22, and distributes heterogeneously in the intake air. The fuel injected from the port injection valve 12, on the other hand, is atomized inside the intake port 17, for example, and is introduced to the cylinder 20 after being raised homogeneously with the intake air.

Those injection valves 11 and 12 of the two types are also provided to other cylinders (not shown) provided in the engine 10. The amounts of fuel to be injected from the cylinder injection valve 11 and the port injection valve 12, and the timings when the fuel is to be injected, are controlled by the engine control device 1. For example, in response to respective control pulse signals being transmitted from the engine control device 1 to the injection valves 11 and 12, respective injection ports of the injection valves 11 and 12 are opened for time durations corresponding to the control pulse signals. In this configuration, the amounts of fuel to be injected (injection fuel amounts) are controlled according to the magnitudes of the control pulse signals (driving poise widths), and the time when the respective injections are to be initiated (injection start time) correspond to the time when the control pulse signals are transmitted.

The cylinder injection valve 11 in connected to a high-pressure pump 14A through a high-pressure fuel supply path 13A. The pert injection valve 12 is connected to a low-pressure pump 14B through a low-pressure fuel supply path 13B. The fuel is supplied to the cylinder injection valve 11 with a pressure higher than the pressure of the fuel to the port injection valve 12. The high-pressure pump 14A and the low-pressure pump 14B are mechanical variable flow pumps for plumbing the fuel. The pumps 14A and 14B operate with driving power supplied from the engine 10 or an electric motor, to discharge the fuel stored in a fuel tank 15 to the supply paths 13A and 13B, respectively. The respective amounts and pressures of the fuel discharged from the pumps 14A and 14B are controlled by the engine control device 1.

[1-3. Valve Mechanism System]

The engine 10 is provided with the variable valve actuating mechanism 40 that controls operations of the rocker arms 35 and 37, or the cams 36 and 38. The variable valve actuating mechanism 40 is a mechanism for changing respective maximise valve lifts and valve timings of the intake valve 27 and the exhaust valve 28, independently or cooperatively with each other. The variable valve actuating mechanism 40 is provided with a valve lift adjustment mechanism 41 and a valve timing adjustment mechanism 42, as mechanisms for varying the amplitudes and timings of swings by the rocker arms 35 and 37.

The valve lift adjustment mechanism 41 is a mechanism that continuously varies the maximum valve lifts of the intake valve 27 and the exhaust valve 28, and has a function to change the amplitudes of swings transmitted from the cams 36 and 38 to the rocker arms 35 and 37, respectively. The rocker arms 35 and 37 may have any structure for varying the amplitudes of the swings. A control parameter for a valve lift will be denoted as a control angle $\theta_{VVL}$. The valve lift adjustment mechanism 41 functions to increase the valve lift with an increase in the control angle $\theta_{VVL}$. The control angle $\theta_{VVL}$ is calculated by a valve control unit 5 in the engine control device 1, and is transmitted to the valve lift adjustment mechanism 41.

The valve timing adjustment mechanism 42 is a mechanism that varies timings (valve timings) for opening the intake valve 27 and closing the exhaust valve 28, and has a function to vary rotation phases of the cams 30 and 38 or the cam shafts, for swinging the rocker arms 35 and 37. By varying the rotation phases of the cams 36 and 38 or the cam shafts, the timings for swinging the rocker arms 35 and 37 can be shifted continuously relative to the rotation phase of the crank shaft 21.

A control parameter for valve timing will be denoted as a phase angle $\theta_{VVT}$. The phase angle $\theta_{VVT}$ indicates how much the phase of the cam 36 or 38 is advanced or retarded relative to the phase of the cam shaft as the reference, and corresponds to the opening time of the intake valve 27 or the closing time of the exhaust valve 28. The phase angle $\theta_{VVT}$ is calculated by the valve control unit 5 in the engine control device 1, end is transmitted to the valve timing adjustment mechanism 42. The valve timing adjustment mechanism 42 controls the respective valve timings to any timings by adjusting phase angles $\theta_{VVT}$ for the cams 36 and 38.

[1-4. Intake and Exhaust Systems]

The intake and exhaust systems of the engine 10 are provided with a turbocharger (supercharger) 30 that supercharges the intake into the cylinder 20, utilizing the exhaust pressure. The turbocharger 30 is provided across an intake path 24 connected upstream to the intake port 17, and an exhaust path 29 connected downstream to the exhaust port 18. A turbine (exhaust turbine) 30A provided to the turbocharger 30 rotates, driven by the exhaust pressure inside the exhaust path 29, and transmits the resulting rotary torque to a compressor (intake compressor) 30B in the intake path 24. Driven by the torque, the compressor 30B compresses the air inside the intake path 24 to feed the compressed air downstream, thereby providing supercharging for the cylinders 20. The supercharging by the turbocharger 30 is controlled by the engine control device 1.

An intercooler 39 is provided on the intake path 24 downstream to the compressor 30B, for cooling down the compressed air. An air filter 33 is provided upstream to the compressor 30B, for filtering the intake air taken in from the outside. Further, an intake bypass path 25 is provided so as to connect the intake paths 24 upstream to and the intake paths 24 downstream to the compressor 30B, and a bypass valve 26 is provided, interposing the intake bypass path 25. The amount of the air flowing through the intake bypass path 25 is adjusted according to the opening of the bypass valve 26. The bypass valve 26 is controlled to be open when the vehicle is decelerated abruptly, fox example, and functions to purge the supercharging pressure provided from the compressor 30B back to the upstream side. Note that the opening of the bypass valve 26 is controlled by the engine control device 1.

A throttle body is connected downstream to the intercooler 39, downstream to which an intake manifold is connected. In the throttle body, an electrically controllable throttle valve 16 is provided. The amount of the air flowing to the intake manifold is adjusted according to the opening of the throttle valve 16 (throttle opening). The throttle opening is controlled by the engine control device 1.

The intake manifold is provided with a surge tank 23 for temporarily retaining the air flowing to each cylinder 20. The intake manifold downstream to the surge tank 23 is branched out toward the respective intake ports 17 of the cylinders 20, and the surge tank 23 is positioned at the branch point. The surge tank 23 functions to reduce intake pulsations and intake interferences that may arise in the cylinders 20.

A catalyst device 43 is provided, interposing the exhaust path 29 downstream to the turbine 30A. The catalyst device 43 has a function to eliminate, break down, and/or remove components, such as particulate matters (PMs), nitrogen oxides (NOx), carbon monoxide (CO), hydrocarbons (HCs), in the exhaust, for example. Upstream to the turbine 30A, an exhaust manifold in connected which branches out toward the respective exhaust ports 18 of the cylinders 20.

An exhaust bypass path 31 is provided so as to connect the exhaust path 29 upstream to and the exhaust path 29 downstream to the turbine 30A, and an electrically controllable waste gate valve 32 is provided, interposing the exhaust bypass path 31. The waste gate valve 32 is a supercharging pressure adjustment valve that adjusts the supercharging pressure by controlling the amount of the exhaust stream flowing toward the turbine 30A. The waste gate valve 32 is provided with an actuator 32b that electrically controls the position (i.e., the opening) of a valve body 32a. The operation of the actuator 32b is controlled by the engine control device 1.

[1-5. Detection Systems]

In the vicinity of the crank shaft 21, an engine rotation speed sensor 44 is provided which detects the rotation speed Ne (number of rotations per unit time) of the crank shaft 21. The vehicle is provided with an accelerator pedal position sensor 45 in any suitable position of the vehicle, which detects how much the accelerator pedal is being depressed (the accelerator opening $A_{PS}$). The accelerator opening $A_{PS}$ is a parameter indicative of a request by she driver to accelerate or start the vehicle, in other words, is the parameter that correlates with the load P on the engine 10 (output request for she engine 10).

In the intake path 24, an air flow sensor 46 is provided which detects the intake flow rate Q. The intake flow rate Q is a parameter indicative of the flow rate of the air that actually passes through the air filter 33. In the surge tank 23, an intake manifold pressure sensor 47 and an intake temperature sensor 48 are provided. The intake manifold pressure sensor 47 detects the pressure in the surge tank 23, which is used as an intake manifold pressure, and the intake temperature sensor 48 detects the intake temperature in the surge tank 23. The respective information detected by the sensors 44-48 is conveyed to the engine control device 1.

[1-6. Control System]

The vehicle having the above-described engine 10 installed therein, is provided with the engine control device 1. The engine control device 1 is configured as an LSI device or an embedded electronic device on which various components, such as a microprocessor, an ROM, and an RAM, are mounted, and the engine control device 1 is connected to a communication line for an in-vehicle network provided in the vehicle.

The engine control device 1 is an electronic control device that collectively controls a wide variety of systems related to the engine 10, e.g., the ignition system, the fuel system, the intake end exhaust systems, end the valve mechanism system, and controls various parameters, such as the amounts of the air and the amounts of the fuel to be supplied to the cylinders 20 in the engine 10, the ignition timings of the respective cylinders 20, and the supercharging pressure. The sensors 44-48 described above are connected to input ports of the engine control device 1. Information supplied to engine control device 1 includes the accelerator opening $A_{PS}$, the intake flow rate Q, the intake manifold pressure, the intake temperature, the engine rotation speed Ne, and the like.

The specific parameters controlled by the engine control device 1 include how much fuel is to be injected from the cylinder injection valve 11 and the port injection valve 12 and when to inject, the ignition timing by the spark plug 22, the valve lifts and valve timings of the intake valve 27 and the exhaust valve 28, the operating state of the turbocharger 30, the opening of the throttle valve 16, the opening of the bypass valve 26, the opening of the waste gate valve 32, and the like. Three types of controls employed in the present embodiment: an injection region control, a supercharging control, and a valve overlap period control, will be described.

[2. Overview of Controls]

[2-1. Injection Region Control]

In the injection region control, fuel injection types are switched according to the operating state of the engine 10 and the magnitude of an output requested to the engine 10. Specifically, on the basis of the engine rotation speed Ne, the engine load P, the amount of the air, the filling efficiency Ec (e.g., the target filling efficiency and the actual filling efficiency), the accelerator opening $A_{PS}$, and the like, for example, one of the following modes is selected: an "MPI mode" where only a port injection is carried out, a "DI mode" where only a cylinder injection is carried out, and a "DI+MPI mode" where fuel is injected combining a port injection and a cylinder injection.

Figure 3:
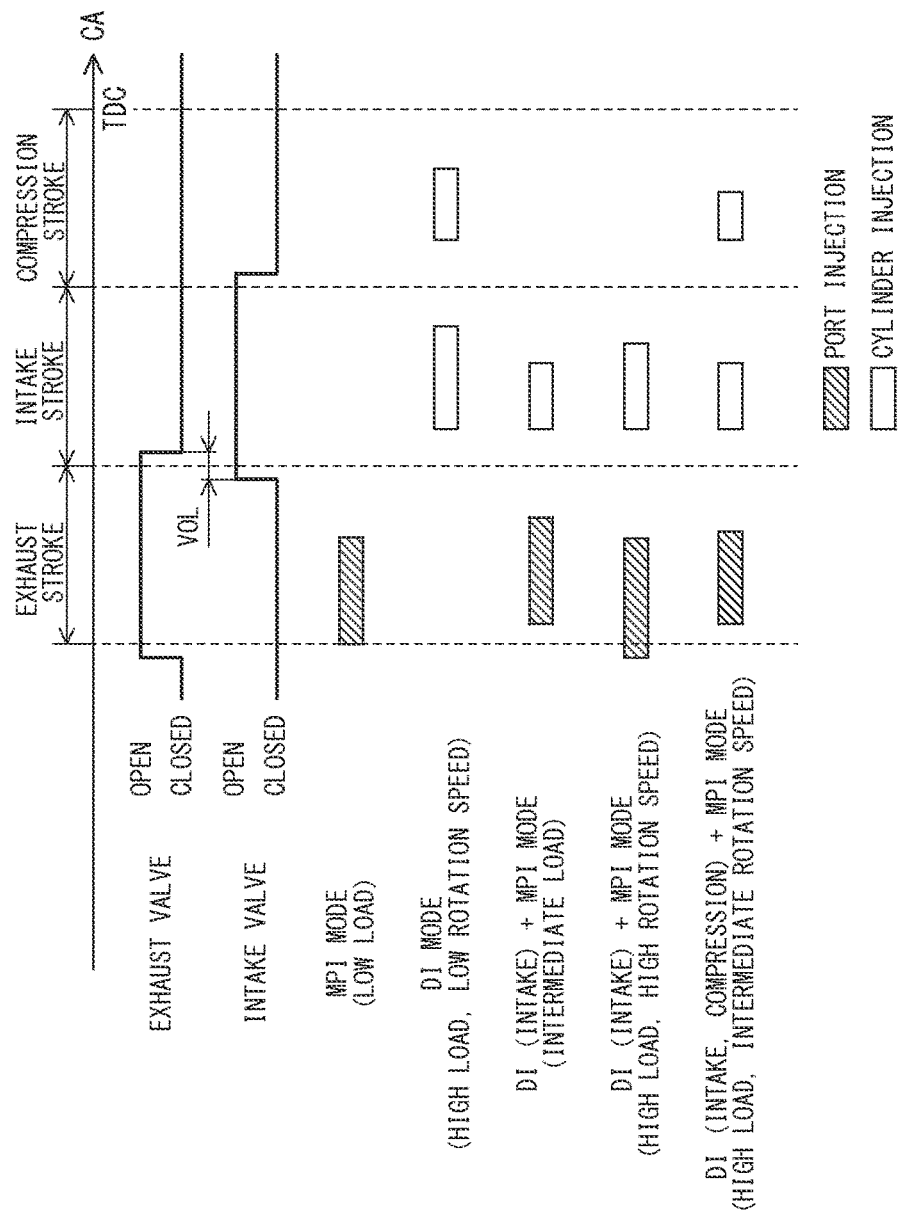
FIG. 3 is a schematic diagram illustrating the open and close timings of an exhaust valve and an intake valve, fuel injection modes selected according to the operating states of the engine, and fuel injection timings in those modes.

FIG. 3 is a schematic diagram illustrating the open and close timings of the exhaust valve 28 and the intake valve 27, fuel injection modes selected according to the operating states of the engine 10, and fuel injection timings in those modes. In the drawings the hatched rectangles indicate durations during which the fuel is being injected from the port injection valve 12 (port injection timing), whereas the white rectangles indicate durations during which the fuel is being injected from the cylinder injection valve 11 (cylinder injection timing). Stated differently, the left ends of the rectangles indicate when fuel injections are started, whereas the right ends indicate when the fuel injections are ended.

The MPI mode is an injection mode that is selected when the load on the engine 10 is low. In the MPI mode, a fuel injection from the cylinder injection valve 11 is prohibited, and the entire injection amount of fuel is injected from the port injection valve 12 for achieving a requested output. The timing (fuel injection timing) for injecting the fuel from the port injection valve 12 in the MPI mode is preset, and fuel is injected at the preset injection timing once the MPI mode is selected. In the drawing, the timing for injecting the fuel from the port injection valve 12 is set in an exhaust stroke.

Note that the fuel injection timing for a port injection is not limited to the exhaust stroke, and the fuel injection timing may be set such that a fuel injection is initiated at a later stage of an expansion stroke prior to the exhaust stroke, or during an intake stroke. In the low load operating state, the advantage of enhanced vaporization by a pore injection is made use of improving the homogeneity of the fuel-air mixture, thereby improving the exhaust performance. Hereinafter, the amount of fuel injected from the port injection valve 12 will be referred to as "the port injection amount $F_P$".

The DI mode is an injection rode that is selected when the load on the engine 10 is high and the rotation speed or the engine 10 is low. In the DI mode, a fuel injection from the port injection valve 12 is prohibited, and the fuel is injected from the cylinder injection valve 11 separately in two steps: during an intake stroke and during a compression stroke, for achieving a requested output. The respective timings for fuel injection from the cylinder injection valve 11 in the DI mode are preset for the intake stroke and the compression stroke, and fuel is injected at the preset injection timings once the DI mode is selected.

After a cylinder injection, the intake air and the combustion chamber are cooled down by the vaporization latent heat of the fuel. This phenomenon is known as the intake air cooling effect, and this effect advantageously acts against knocking, resulting in an increased compression ratio. Particularly, by injecting the fuel separately in two steps: during an intake stroke and during a compression stroke, it is possible to maximize the intake air cooling effect. A higher compression ratio increases the volumetric efficiency, resulting in a higher engine output and leading to an improved fuel consumption. Furthermore, a fuel injection during a compression stroke improves combustions and enhances the anti-knocking property.

In a low rotation speed, the phenomenon, known as blow-by, tends to take place during a valve overlap period, in which intake air (fuel-air mixture) from the intake port 17 directly enters the exhaust port 18. The blow-by permits the fuel supplied through the pore injection valve 12 to flow to the exhaust path 29, through the cylinder 20, causing a drop in the engine output caused by fuel shortage, as well as a reduction in the exhaust performance due to hydrocarbons flowing to the exhaust system. Blow-by tends to take place while intake air is being compressed by the turbocharger 30, particularly while the engine 10 is in a low rotation speed. Accordingly, blow-by is prevented by prohibiting a port injection when the load on the engine 10 is high and the engine 10 is at a low rotation speed. Hereinafter, the amount of fuel injected from the cylinder injection valve 11 will also be referred no as the "cylinder injection amount $F_D$".

The DI+MPI mode is en injection mode that is selected when the operating state of the engine 10 is not in the low load (i.e., when the MPI mode is not selected) and the operating state of the engine 10 is not in the high load and in the low rotation speed (i.e., when the DI mode is not selected). In the DI+MPI mode, for achieving a requested output, fuel is injected from the cylinder injection valve 11 and from the port injection valve 12, at a predetermined ratio R of the injection amounts. In other words, both the cylinder injection valve 11 and the port injection valve 12 are operated in a single combustion cycle, for carrying out both a cylinder injection and a port injection. This provides both the advantage of the cylinder injection and the advantage of the port injection.

The ratio R of the port injection amount $F_P$ to the cylinder injection amount $F_D$ ($=F_P/F_D$) is preset, and unless the ratio is changed by a ratio modification unit 3c (described later), the fuel is injected from the cylinder injection valve 11 and from the port injection valve 12 at this ratio R in the DI+MPI mode. The ratio R of the port injection amount $F_P$ to the cylinder injection amount $F_D$ is set to a value of $0<R\leq 1$. In other words, more fuel is injected from the cylinder injection valve 11 than from the port injection valve 12. In place of the ratio R, the ratio R1 ($=F_D/F_T$) of the cylinder injection amount $F_D$ to the total amount of the fuel to be injected in a single combustion cycle (the total fuel amount $F_T$, described later), and the ratio R2 ($=F_P/F_T$) of the port injection amount $F_P$ to the total fuel amount $F_T$, may be preset. In this case, R1 and R2 will satisfy the following: $R1 \geq R2$ and $R=R1+R2$.

Further, there are two types of the DI+MPI mode, depending on the operating state of the engine 10: a first DI+MPI mode (hereinafter, referred to as the "DI (intake)+MPI mode") where fuel is injected from the cylinder injection valve 11 during an intake stroke only; and a second DI+MPI mode (hereinafter, referred to as the "DI (intake, compression)+MPI mode") where the fuel is injected from the cylinder injection valve 11 separately in two steps: during an intake stroke and during a compression stroke. The DI (intake)+MPI mode is selected when the operating state of the engine 10 is in the intermediate load, or in the high load and the high rotating speed. The DI (intake, compression)+MPI mode is selected when the operating state of the engine 10 is in the high load and the intermediate rotating speed. In other words, fire operating state of the engine 10 is in the high load, one of the three modes, namely, the DI mode, the DI (intake, compression)+MPI mode, the DI (intake)+MPI mode, in the ascending order of the rotation speed, is selected according to the rotation speed Ne.

In the intermediate load operating state where the DI (intake)+MPI mode is selected, the total fuel injection amount $F_T$ is smaller than that in the high load because of a smaller requested output than in the high load. A cylinder injection during a compression stroke may induce smoke. Therefore, in the intermediate load operating state, limiting a cylinder injection only during an intake stroke prevents smoke, while satisfying the requested output.

When the operating state is in the high load and high rotation speed state where the DI (intake)+MPI mode is selected, by limiting the timing of a cylinder injection to an intake stroke, smoke is prevented while ensuring sufficient time for vaporization of the fuel injected from the cylinder injection valve 11. The timing for a fuel injection through the cylinder injection valve 11 during an intake strobe and the timing for a fuel injection through the port injection valve 12, in the DI (intake)+MPI mode, are preset. Once the DI (intake)+MPI mode is selected, unless the timings are changed by a port injection timing modification unit 3e (described later), the fuel is injected at the preset injection timings. Note that the port injection timings in this mode are set such that a port injection is carried out the duration from a later stage of an expansion stroke to an exhaust stroke, for example. This provides sufficient time for forming fuel-air mixture, resulted in an improved homogeneity, thereby improving the exhaust performance.

When the operating state is in the high load and intermediate rotation speed mode where the DI (intake, compression)+MPI mode is selected, by carrying out a cylinder injection separately in two steps: during an intake stroke and during a compression stroke, the intake air cooling effect is maximized while improving combustions. An additional port injection during an exhaust stroke increases the amount of the premix, resulting in an improved exhaust performance. Since the three-step fuel injection reduces fuel injection amounts at respective strokes as compared to the fuel injection amounts in the other operating states, blow-by and smoke are suppressed.

In the DI (intake, compression)+MPI mode, the timings for fuel injections through the cylinder injection value 11 during intake and compression strokes, and the timing for a fuel injection through the port injection valve 12, are preset. Thus, once the DI (intake, compression)+MPI mode is selected, unless the timings are changed by the port injection timing modification unit 3e (described later), the fuel is injected at the preset injection timings.

When the DI (intake, compression)+MPI mode is selected, the cylinder injection amount $F_D$ is divided into the amount of fuel $F_{DI}$ to be injected during an intake stroke (hereinafter, referred to as the "intake injection amount $F_{DI}$"), and the amount of fuel $F_{DC}$ to be injected during a compression stroke (hereinafter, referred to as the "compression injection amount $F_{DC}$"), for injecting the fuel in each stroke. The ratio W of the compression injection amount $F_{DC}$ to the intake injection amount $F_{DI}$ ($=F_{DC}/F_{DI}$) is preset, and the cylinder injection amount $F_D$ is divided at this ratio W in the DI (intake, compression)+MPI mode.

The ratio W of the compression injection amount $F_{DC}$ to the intake injection amount $F_{DI}$ is set to a value of 0<W<1. In other words, more fuel is injected from the cylinder injection valve 11 during an intake stroke than during a compression stroke, and the rest of the fuel is injected during a compression stroke. In place of ratio W, the ratio W1 ($=F_{DI}/F_D$) of the intake injection amount $F_{DI}$ to the cylinder injection amount $F_D$ ($=F_{DI}/F_D$), and the ratio W2 ($=F_{DC}/F_D$) of the compression injection amount $F_{DC}$ to the cylinder injection amount $F_D$, may be preset. In this case, W1 and W2 will satisfy the following: W1>W2 and W=W1+W2.

[2-2. Supercharging Control]

A supercharging control is a control for determining the operating state of the turbocharger 30 (e.g., whether the turbocharger 30 is activated or not, or the magnitude of the action by the turbocharger 30), depending on the operating state of the engine 10 and the magnitude of an output requested to the engine 10. Specifically, a supercharging control is carried out by controlling the opening of the waste gate valve 32, on the basis of various parameters, such as the engine rotation speed Ne, the load P on true engine 10, the amount of the air, the filling efficiency Ec (e.g., the target filling efficiency and the actual filling efficiency), and the accelerator opening $A_{PS}$, for example.

In a typical supercharging control, when the load requested to the engine 10 is greater than the predetermined load $P_S$, the waste gate valve 32 is closed and the turbocharger 30 is activated. As a result, the supercharging increases the amount of intake air introduced to the cylinder 20, resulting in an increased engine output. In contrast, when the load requested to the engine 10 is equal to or less than the predetermined load $P_S$, the waste gate valve 32 is opened to allow passage of the exhaust air through the exhaust bypass path 31. As a result, the exhaust turbine output from the turbocharger 30 is reduced, or the turbocharger 30 is deactivated.

[2-3. Valve Overlap Period Control]

A valve overlap period control is a control for determining an optimal valve overlap period, for improving the volumetric efficiency of intake air and the engine output and for addressing to blow-by of a fuel-air mixture. A valve overlap period is an overlapped of a period during which the intake valve 27 is open and a period during which the exhaust valve 28 is open. A longer valve overlap period enhances the scavenging effect and increases the volumetric efficiency of intake air, leading to an improved engine output. During the valve overlap period, however, both the intake valve 27 and the exhaust valve 28 are open, blow-by of a fuel-air mixture containing fuel injected from the port injection valve 12 tends to take place. Particularly when the supercharging control activates the turbocharger 30, blow-by may take place frequently.

The valve overlap period is set, depending on the operating state of the engine 10 and the magnitude of an output requested to the engine 10, for example. In this embodiment, the valve overlap period is set when the engine 10 is in the high load operating state. Three settings are used for the valve overlap period in the present embodiment.

Firstly, when true engine 10 is in the high load operating state and the DI (intake, compression)+MPI mode has been selected in the injection region control, a "normal valve overlap period" is set using any of well-known techniques, for example. Otherwise, when the DI mode has been selected in the injection region control (i.e., in the high load and low rotation speed region), the valve overlap period is extended from the "normal valve overlap period". This is for maximizing the scavenging effect, since, in the DI mode, there is no need to address any blow-by of a fuel-air mixture containing fuel injected through the port injection valve 12.

When the DI (intake)+MPI mode has been selected in the injection region control (i.e., in the high load and high rotation speed state region), the valve overlap period is shortened from the "normal valve overlap period". This suppresses blow-by of fuel injected from the port injection valve 12. The variable valve actuating mechanism 40 is controlled such that the set or changed valve overlap period is provided.

When the engine 10 is in the low or intermediate load opening states, the valve overlap period is set to 0 (or any preset predetermined value), for example, and the variable valve actuating mechanism 40 is controlled accordingly.

[3. Control Configuration]

Figure 2:
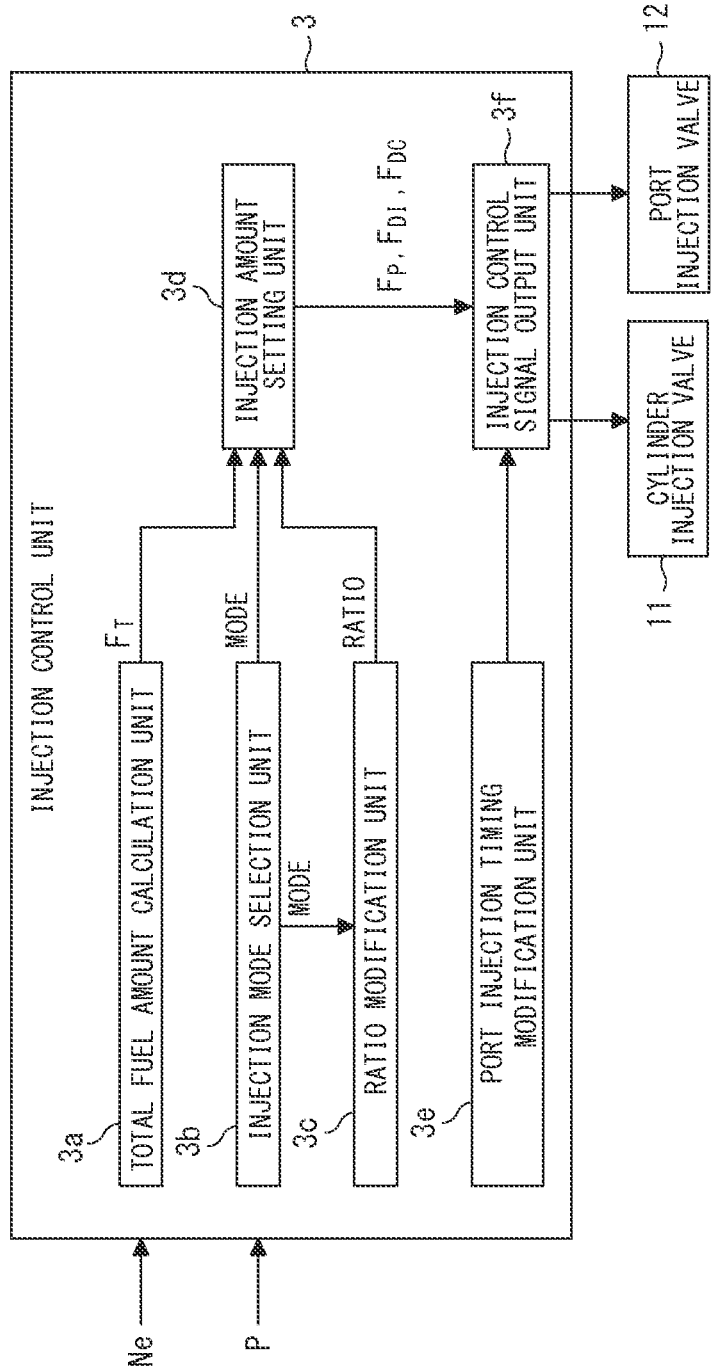
FIG. 2 is a diagram exemplifying a block configuration of an injection region control unit in the control device in FIG. 1.

Referring to FIG. 1, the engine control device 1 is provided with an engine load calculation unit 2, an injection control unit 3, a supercharging control unit 4, and a valve control unit 5, as elements for achieving the controls described above. The valve control unit 5 is provided with the valve overlap modification unit 5a. Referring also to FIG. 2, the injection control unit 3 is provided with a total fuel amount calculation unit 3a, an injection mode selection unit 3b, a ratio modification unit 3c, an injection amount setting unit 3d, a port injection timing modification unit 3e, and an injection control signal output unit 3f. These of elements may be embodied by electronic circuits (hardware), or may be programmed as software, or part of the functions may be provided in hardware and the rest may be provided in software.

[3-1. Engine Load Calculation Unit]

The engine load calculation unit 2 is adapted to calculate the magnitude of the load 2 on the engine 10. As used therein, the term, "load P" represents the force, power (engine output, horsepower), work (energy), and the like, which imposes resistance on the engine 10. Typically, an engine output requested to the engine 10 or any other parameters correlated thereto, are handled as the load P.

The load P is calculated on the basis of the amount of air introduced to the cylinders 20, for example, or is calculated on the basis of the flow rate of intake air or the flow rate of exhaust air, or the like. The load P may be calculated on the basis of any other parameters, such as the insane pressure, the exhaust pressure, the vehicle speed V, the rotation speed Ne, the accelerator opening $A_{PS}$, an operating state of an external load device, or the like. In the present embodiment, the magnitude of the load P is calculated on the basis of the filling efficiency Ec or the volumetric efficiency Ev, which are calculated on the basis of the intake flow rate Q and the rotation speed Ne. The value of the load P calculated in this unit is transmitted to the injection control unit 3, the supercharging control unit 4, and the valve control unit 5.

[3-2. Injection Region Control Unit]

The injection control unit (injection controller) 3 is adapted to carry out an injection region control by controlling a fuel injection through the cylinder injection valve 11 and a fuel injection through the port injection valve 12.

The total fuel amount calculation unit 3a is reacted to calculate the amount of fuel to be injected for achieving a requested output in a single combustion cycle, as the total fuel amount $F_T$, on the basis of the rotation speed he of tire engine 10 and the load P calculated by the engine load calculation unit 2. For example, a fuel injection amount map including the load P on the engine 10 and the rotation speed Ne, as arguments, is stored in the injection control unit 3, in advance, and the total amount of fuel to be injected (i.e., the total fuel amount $F_T$) is calculated using this map. The total fuel amount $F_T$ calculated in this unit is transmitted to the injection amount setting unit 3d.

The injection mode selection unit 3b is adapted to select one of the above-described fuel injection modes: the MPI mode, the DI mode, and the DI+MPI mode, on the basis of the operating state of the engine 10. The injection control unit 3 stores a map that defines relationships between operating states of the engine 10 and the fuel injection modes, calculation formulae, or the like. One fuel injection mode is selected on the basis of such a map, calculation formulae, or the like.

Figure 4:
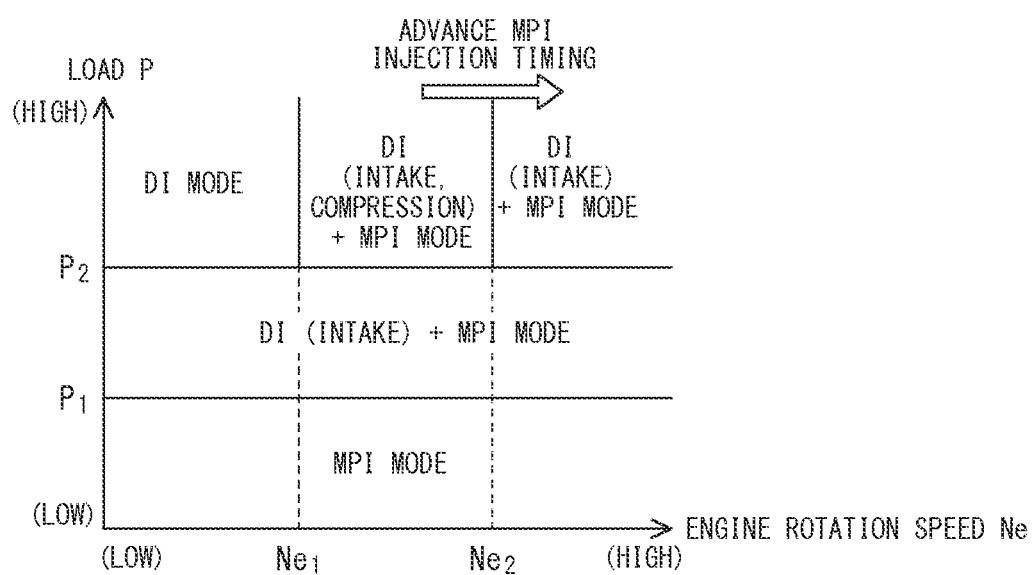
FIG. 4 is a map for selecting fuel injection modes in accordance with this control device.

In the present embodiment, an injection mode map as shown in FIG. 4 is stored in the injection control unit 3, in advance. In this injection mode map, the fuel injection modes are specified on a coordinate plane defined by the load P as the vertical axis and the rotation speed Ne as the horizontal axis. Specifically, in the low load operating state where the load P is less than a predetermined first load $P_1$, the MPI mode region is specified. Here, the first load $P_1$ is a preset constant, and is approximately equal to or smaller than the predetermined load $P_S$ that is the threshold for determining whether or not supercharging by the turbocharger 30 is activated. In other words, in the MPI mode region, supercharging by the turbocharger 30 is not activated.

In the intermediate load operating state where the load P is equal to or greater than the first load $P_1$ and less than a predetermined second load $P_2$, the DI (intake)+MPI mode region is specified. Here, the second load $P_2$ is a preset constant, and is greater than the first load $P_1$ and is approximately 80% of the total load.

In the high load operating state where the load P is equal to or greater than the second load $P_2$, the following three regions: the DI mode region (the first rotation speed region); the DI (intake, compression)+MPI mode region (the first rotation speed region, boundary speed region); and the DI (intake)+MPI mode region (the second rotation speed region, boundary speed region), are specified, in the ascending order of the rotation speed Ne. For the sake of the brevity of description, the region where the rotation speed Ne is less than a first rotation speed $Ne_1$, is referred to as the DI mode region. The region where the rotation speed Ne is equal to or greater than the first rotation speed $Ne_1$ and less than a second rotation speed $Ne_2$ is referred to as the DI (intake, compression)+MPI code region. The region where the rotation speed Ne is equal to or greater than the second rotation speed $Ne_2$ is referred to as the DI (intake)+MPI mode region. Here, the first rotation speed $Ne_1$ is a preset constant greater than zero, and is a value equivalent to or greater than the idle rotation speed, for example. The second rotation speed $Ne_2$ is also a preset constant, and is greater than the first rotation speed $Ne_1$.

The MPI mode region, the DI mode region, the DI (intake)+MPI mode region, and the DI (intake, compression)+MPI mode region, are the regions where the MPI mode, the DI mode, the DI (intake)+MPI mode, the DI (intake, compression)+MPI mode, are selected, respectively. By applying the rotation speed Ne and the load P to the injection mode map in FIG. 4, the injection mode selection unit 3b selects one fuel injection mode. The selected fuel injection mode is transmitted to the ratio modification unit 3c and the injection amount setting unit 3d, as well as to the valve control unit 5.

The ratio modification unit 3c is adapted to change the ratio R of the port injection amount $F_P$ to the cylinder injection amount $F_D$, according to the rotation speed be of the engine 10, when the load P is in the high load operating state of the second load $P_2$ or greater and the fuel injection mode is the DI+the MPI mode. As indicated by the solid line in FIG. 5(a), the ratio modification unit 3c increases the ratio R with an increase in the rotation speed Ne, and decreases the ratio R with a decrease in the rotation speed Ne.

Stated differently, the ratio modification unit 3c gradually decreases the ratio R1 of the cylinder injection amount $F_D$ to the total fuel amount $F_T$ (indicated by the dashed line in the drawing), and gradually increases the ratio R2 of the port injection amount $F_P$ to the total fuel amount. $F_T$ (indicated by the chain double-dashed line in the drawing), as the rotation speed Ne increases relative to the first rotation speed $Ne_1$. Such a control is for satisfying a requested output at high rotation speeds Ne where the amount of fuel that car be injected into the cylinder 20 in a single combustion cycle (i.e., the cylinder injection amount $F_D$) is limited. At low rotation speeds Ne, on the other hand, this is made for suppressing blow-by that may take place during a valve overlap period.

Figure 5A:
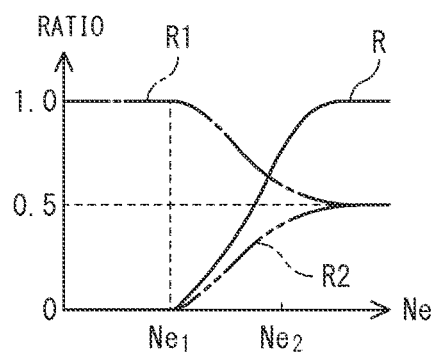
FIG. 5(a) is a graph showing the engine rotation speed versus the ratio of fuel injection in the high load operating state, and (b) is a graph showing the relationship between the ratio of the port injection amount to cylinder injection amount, and the torque.
Figure 5B:
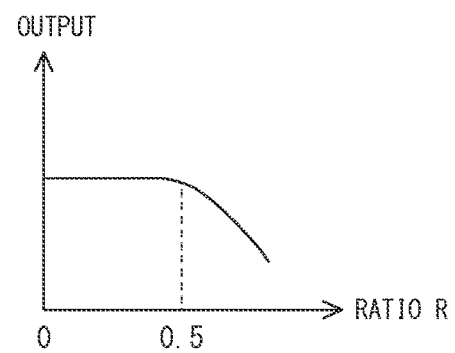

In this control, as indicated by the solid line in FIG. 5(a), the ratio modification unit 3c limits the ratio R of the port injection amount $F_P$ to the cylinder injection amount $F_D$ to 1 at maximum. In other words, as indicated by the dashed line and the double-dashed line in the drawing, at high rotation speeds, the ratio R1 of the cylinder injection amount $F_D$ to the total fuel amount $F_T$ is set to be equal to the ratio R2 of the pert injection amount $F_P$ to the total fuel amount $F_T$. This is because, as shown in FIG. 5(b), when the ratio R of the port injection amount $F_P$ to the cylinder injection amount $F_D$ reaches 0.5 or greater, the intake air cooling effect through the cylinder injection sharply diminishes for the same total fuel amount $F_T$, and the output becomes extremely low. When the ratio R is changed by the ratio modification unit 3c, the changed ratio R is transmitted to the injection amount setting unit 3d.

The injection amount setting unit 3d is adapted to set the cylinder injection amount $F_D$ from the cylinder injection valve 11 (the intake injection amount $F_{DI}$ and the compression injection amount $F_{DC}$) and the port injection amount $F_P$ from the port injection valve 12, according to the fuel injection mode selected by the injection mode selection unit 3b. Specifically, the injection amount setting unit 3d sets the values, using the total fuel amount $F_T$ calculated by the total fuel amount calculation unit 3a, the ratio R and the ratio W that are preset, and the ratio R changed by the ratio modification unit 3c. The intake injection amount $F_{DI}$, the compression injection amount $F_{DC}$, and the port injection amount $F_P$ that are set in this unit above, are transmitted to the injection control signal output unit 3f.

Since only the port injection valve 12 is used while the MPI mode is selected, the injection amount setting unit 3d assigns 0 to the cylinder injection amount $F_D$, and assigns the value of the total fuel amount $F_T$ to the port injection amount $F_P$.

Since only the cylinder injection valve 11 is used while the DI mode is selected, the injection amount setting unit 3d assigns 0 to the port injection amount $F_P$, and sets the injection amounts $F_{DI}$ and $F_{DC}$, by dividing the total fuel amount $F_T$, into the intake injection amount $F_{DI}$ and the compression injection amount $F_{DC}$, respectively, on the basis of the preset ratio W.

When the DI (intake)+MPI mode is selected in the intermediate load operating state, the injection amount setting unit 3d sets the port injection amount $F_P$, by dividing the total fuel amount $F_T$ into the cylinder injection amount $F_D$, and the port injection amount $F_P$, on the basis of the preset ratio R. It further assigns the cylinder injection amount $F_D$ to the intake injection amount $F_{DI}$, and assigns 0 to the compression injection amount $F_{DC}$.

When the DI (intake)+MPI mode is selected in the high load operating state, the injection amount setting unit 3d sets the port injection amount $F_P$, by dividing the total fuel amount $F_T$ to the cylinder injection amount $F_D$ and the port injection amount $F_P$, on the basis of the ratio R changed by the ratio modification unit 3c. It further seta the cylinder injection amount $F_D$ to the intake injection amount $F_{DI}$, and assigns 0 to the compression injection amount $F_{DC}$.

When the DI (intake, compression)+MPI mode is selected in the high load operating state, the injection amount setting unit 3d sets the port injection amount $F_P$, by dividing the total fuel amount $F_T$ into the cylinder injection amount $F_D$ and the port injection amount $F_P$, on the basis of the ratio R changed by the ratio modification unit 3c. It further sets the injection amounts $F_{DI}$ and $F_{DC}$ by dividing the cylinder injection amount $F_D$ into the intake injection amount $F_{DI}$ and the compression injection amount $F_{DC}$, respectively, on the basis of the preset ratio W.

The port injection timing modification unit 3e is adapted to change the time $t_p$ to start a fuel injection through the port injection valve 12 (hereinafter, referred to as the "port injection start time $t_p$") according to the rotation speed Ne, when the load P is in the high load operating state of the second load $P_2$ or greater and the selected fuel injection mode involves a port rejection (i.e., the DI+MPI mode). The injection control unit 3 stores a map that defines relationships between rotation speeds Ne of the engine 10 and the port injection start time $t_p$, calculation formulae, or the like. The port injection start time $t_p$ is changed on the basis of such a map, calculation formulae, or the like. In response to the change in the port injection start time $t_p$, the period of a fuel injection through the port injection valve 12 (fuel injection timing) is changed.

Figure 6:
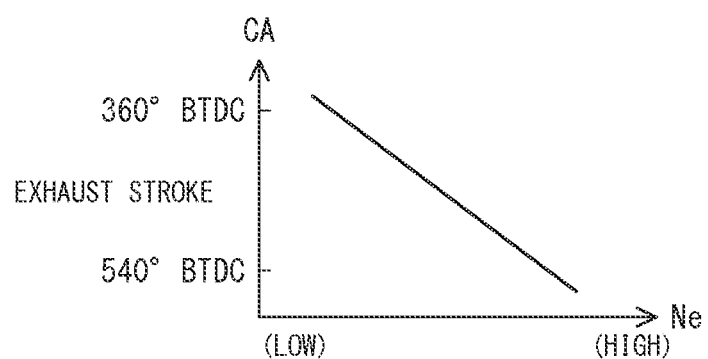
FIG. 6 is a map to which the port injection start time is set for the engine rotation speed.

In the present embodiment, a port injection start time modification map, as shown in FIG. 6, is stored in the injection control unit 3, in advance. In the port injection start time modification map, the vertical axis represents the rotation angle (CA) of the crank shaft 21 and the hot frontal axis represents the rotation speed Ne, and the port injection start time $t_p$ is advanced further with an increase in the rotation speed Ne. In the map shown in FIG. 6, the port injection start time $t_p$ is set within a range from a later stage of an expansion stroke to an earlier stage of an intake stroke.

In other words, when the port injection start time $t_p$ is advanced furthest, the port injection start time $t_p$ is set at the later stage of the expansion stroke, and fuel is injected from the port injection valve 12 during the period from the later stage of the expansion stroke to the exhaust stroke (or to the earlier stage of the intake stroke). In contrast, when the port injection start time $t_p$ is retarded furthest, the port injection start time $t_p$ is set to an intake stroke, and fuel is injected free the port injection valve 12 during the intake stroke. By applying the rotation speed Ne to the port injection start time modification map in FIG. 6, the port injection timing modification unit 3e sets the port injection start time $t_p$ according to the rotation speed Ne.

In this configuration, as shown by the white arrow in the FIG. 4, the port injection timing (MPI injection timing) is advanced further with an increase in the rotation speed Ne, which ensures sufficient time for forming fuel-air mixture. In contrast, the port injection timing is retarded when the rotation speed Ne is low, to suppress blow-by during a valve overlap period. When the port injection start time $t_p$ is changed by the port injection timing modification unit 3e, the changed port injection start time $t_p$ is transmitted to the injection control signal output unit 3f.

The injection control signal output unit 3f is adapted to output control signals to the cylinder injection valve 11 and the port injection valve 12, such that the fuel injection amounts set by the injection amount setting unit 3d are provided according to the fuel injection mode selected by the injection mode selection unit 3b, at predetermined fuel injection timings. In response to those control signals, the cylinder injection valve 11 and the port injection valve 12 are operated at the time and in durations corresponding to the control signals. As a result, the fuel is injected in the desired cylinder injection amount $F_D$ (the intake injection amount $F_{DI}$ and the compression injection amount $F_{DC}$) and the desired port injection amount $F_P$, at the predetermined fuel injection start time. Once the port injection start time $t_p$ is changed by the port injection timing modification unit 3e, a port injection is carried out at the new port injection start time $t_p$.

[3-3. Supercharging Control Unit]

The supercharging control unit 4 is adapted to carry out the above-described supercharging control. Specifically, the supercharging control unit 4 determines that supercharging is required if the load P requested to the engine 10 is greater than a predetermined load $P_S$, and controls the actuator 31b to close the waste gate valve 32. As a result, the turbocharger 30 is activated (ON state), and supercharging increases the amount of intake air introduced to in the cylinder 20.

Otherwise, the supercharging control unit 4 determines that no supercharging is required if the load P requested to the engine 10 is equal to or less than the predetermined load $P_S$, and control the actuator 32b to open the waste gate valve 32. This allows passage of the exhaust air through the exhaust bypass path 31, and thus reduces the exhaust turbine output from the turbocharger 30 or deactivates the turbocharger 30 (OFF state).

The condition for determining whether supercharging is to be activated or not is not limited to the comparison of the requested load F with the predetermined load $P_S$. For example, a separate condition that is different from that for selecting a fuel injection mode may be employed, or a condition may be specified as predetermined regions on the map shown in FIG. 4. As an exemplary condition specified on the map in FIG. 4, the predetermined load $P_S$ may have the same value as $P_1$. In addition to the open/close control, the opening of the waste gate valve 31 may also be controlled.

[3-4. Valve Control Unit]

The valve control unit (variable valve controller) 5 is adapted to carry out the above-described valve overlap period control by controlling operations of the variable valve actuating mechanism 40. The valve control unit 5 sets the valve overlap period, according to the operating state of the engine 10 (e.g., the rotation speed Ne and/or the load P) and/or the magnitude of an output requested to the engine 10. In this embodiment, the valve overlap period is provided at least when the engine 10 in the high load operating state.

The valve overlap modification unit 5a is adapted to change the valve overlap period that has been preset according to the engine rotation speed Ne, when the engine 10 is in the high load operating state. Here, the valve overlap modification unit 5a extends or shortens the valve overlap period, according to which mode has been selected by the injection mode selection unit 3b. Specifically, the valve overlap modification unit 5a extends the valve overlap period when the DI mode is selected, whereas shortens the valve overlap period that is set when the DI (intake)+MPI mode is selected. How long the valve overlap period is extended or shortened is determined, on the basis of the engine rotation speed Ne and/or the load P, for example.

The valve control unit 5 sets respective control angle $\theta_{VVL}$ and phase angle $\theta_{VVT}$ for the intake valve 27 and the exhaust valve 28 such that the valve overlap period that has been set or changed, is provided. The valve control unit 5 then transmits the information of the control angles $\theta_{VVL}$ and the phase angles $\theta_{VVT}$, to the valve lift adjustment mechanism 41 and the valve timing adjustment mechanism 42 in the variable valve actuating mechanism 40, for providing the optimal valve overlap periods.

[4. Flowcharts]

Figure 7:
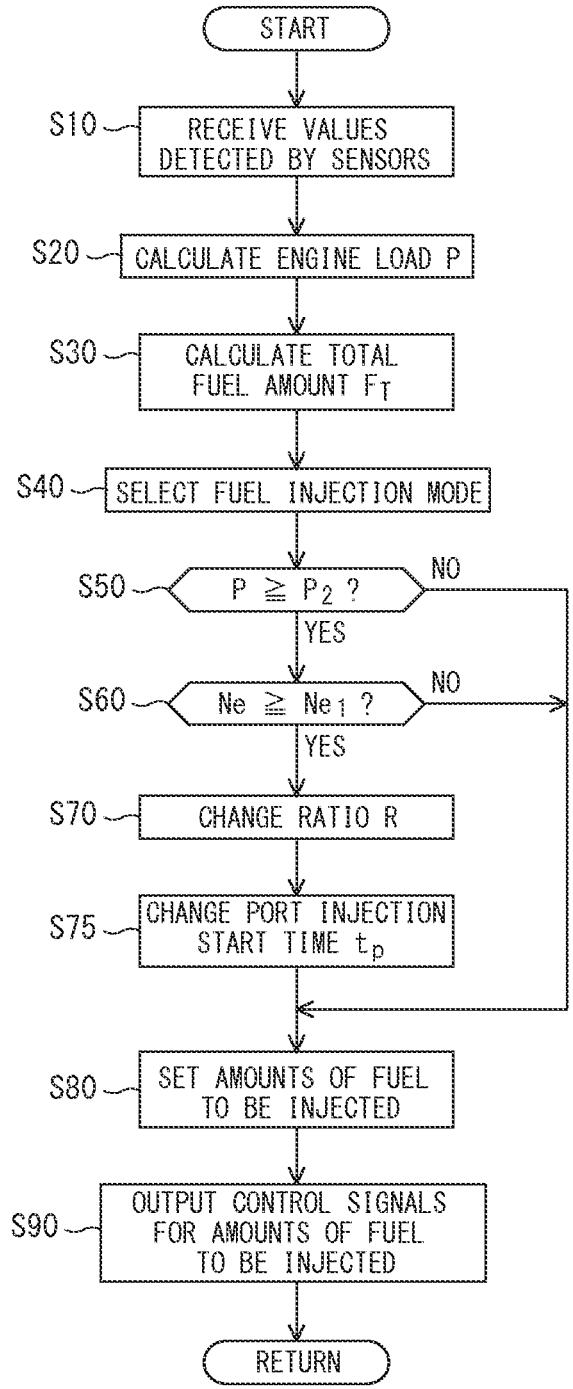
FIG. 7 is a flowchart exemplifying a control procedure of an injection region control in the engine control device.
Figure 8:
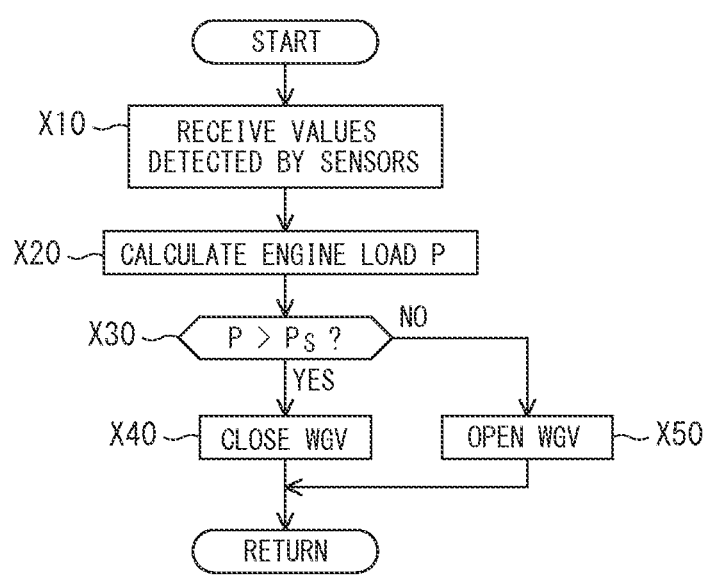
FIG. 8 is a flowchart exemplifying a control procedure of a supercharging control in the engine control device.
Figure 9:
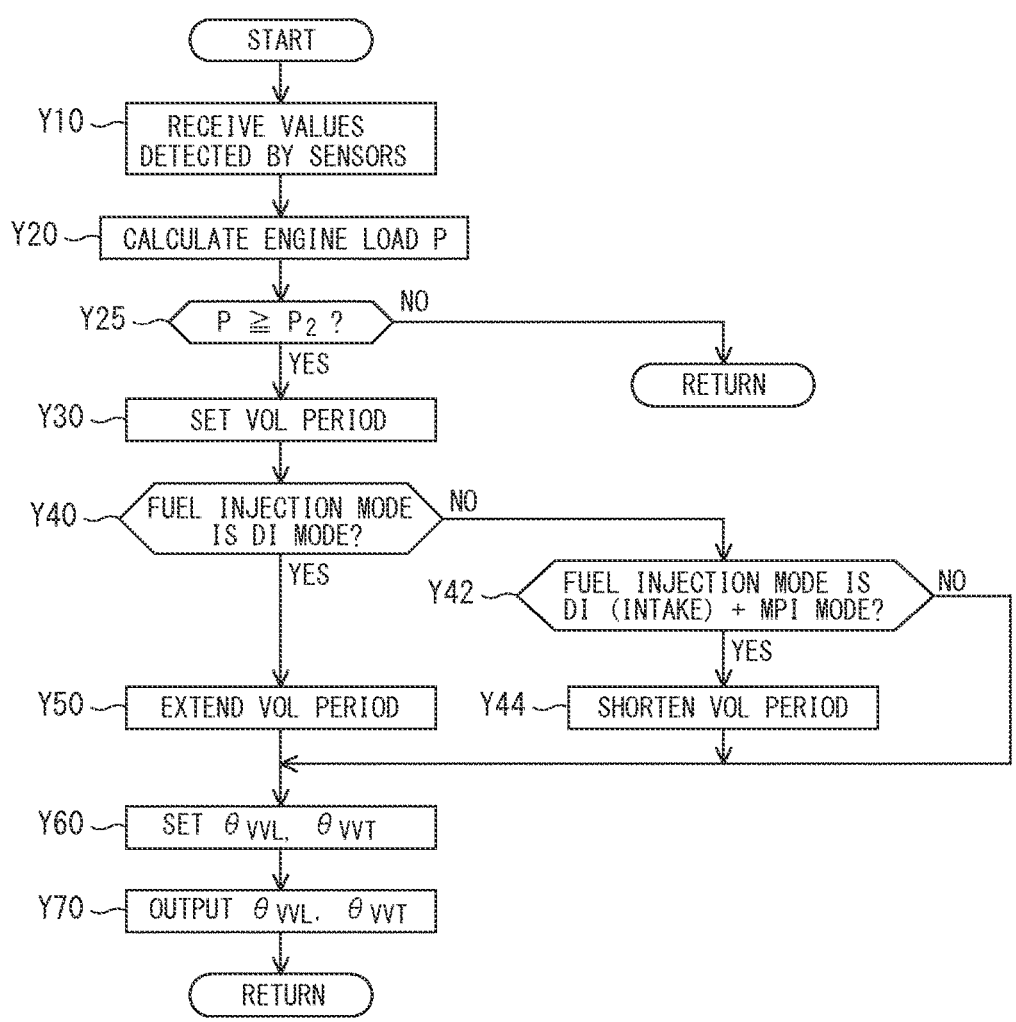
FIG. 9 is a flowchart exemplifying a control procedure of a valve overlap period control in the engine control device.

FIGS. 7 to 9 are flowcharts for describing procedures of the injection region control, the supercharging control, and the valve overlap period control. These flows are executed in the engine control device 1 repeatedly at predetermined computation cycles.

Firstly, the injection region control will be described. Referring to in FIG. 7, in Step S10, various types of information detected by the sensors 44-48 are entered to the engine control device 1. In Step S20, the load P on the engine 10 is calculated on the basis of the intake flow rate Q, the rotation speed Ne, or the like, in the engine lead calculation unit 2. In following Step S30, a total fuel amount $F_T$ is calculated in the total fuel amount calculation unit 3a.

In Step S40, one of the fuel injection modes is selected on the basis of the operating state of the engine 10 in the injection mode selection unit 3b. Upon selecting a feel injection mode, it is determined in which region the rotation speed Ne and the load P of the present time fall within the map as shown in FIG. 4, for example. In Step S50, it is determined whether or not the load P is equal to or greater than the second load $P_2$. If the load P is high of being equal to or greater than the second load $P_2$, the flow proceeds to Step S60, wherein it is determined whether or not the rotation speed be is equal to or greater than the first rotation speed $Ne_1$.

If the rotation speed Ne is equal to or greater than the first rotation speed $Ne_1$, the operating state is in the high load and intermediate or higher rotation speed state and the flow proceeds to Step S70. In Step S70, the preset ratio R is changed according to the rotation speed Ne in the ratio modification unit 3c. Upon changing the ratio R, the rotation speed Ne of the present time is applied to the graph as shown in FIG. 5(a), for example. In following Step S75, the preset port injection start time $t_p$ is changed according to the rotation speed Ne in the port injection timing modification unit 3e, and the flew proceeds to Step S80. Otherwise, if either one of the determinations in Step S50 or in Step S60 does not hold true, the flow proceeds to Step S80.

In Step S80, the intake injection amount $F_{DI}$ and the compression injection amount $F_{DC}$ to be injected from the cylinder injection valve 11 are set and the port injection amount $F_P$ to be injected from the port injection valve 12 is set, according to the fuel injection mode, in the injection amount setting unit 3d. Then in Step S90, control signals are output to the cylinder injection valve 11 and the port injection valve 12 in the injection control signal output unit 3f, such that it is ensured that the fuel is injected in Step S80 in the amounts of fuel injection set, at the fuel injection timings that is preset or changed in Step S75.

Next, the supercharging control will be described. As shown in FIG. 8, in Step X10, various types of information detected by the sensors 44-48 are entered to the engine control device 1. In Step X20, the load P on the engine 10 is calculated in the engine load calculation unit 2, on the basis of the intake flow rate Q, the rotation speed Ne, or the like. In following Step X30, it is determined in the supercharging control unit 4 whether or not the load P is greater than the predetermined load $P_S$.

If the load P is greater than the predetermined load $P_S$, in Step X40, the waste gate valve 32 (WGV) is closed and the turbocharger 30 is activated. Otherwise, the load P is equal to or less than the predetermined load $P_S$, in Step X50, the waste gate valve 32 (WGV) is opened and the turbocharger 30 is deactivated.

Finally, the valve overlap period control will be described. As shown in FIG. 9, in Step Y10, various types of information detected by the sensors 44-48 are entered to the engine control device 1. In Step Y20, the load P on the engine 10 is calculated in the engine load calculation unit 2, on the basis of the intake flow rate Q, the rotation speed Ne, or the like. In following Step Y25, it is determined whether or not the load P is high of being equal to or greater than the second load $P_2$. If it is high, in Step Y30, the valve overlap period (VOL) is set by the valve control unit 5. Otherwise, if it is not high, this flow returns.

In Step Y40, it is determined whether or not the fuel injection mode selected in Step S40 in FIG. 7 is the DI mode. If the mode is the DI mode, the flow proceeds to Step Y50 wherein the valve overlap period set in Step Y30 is extended and the flow proceeds to Step Y60. Otherwise, if the mode is not the DI mode, the flow proceeds to Step Y42 where if is determined whether or not the fuel injection mode is the DI (intake)+MPI mode.

If the mode is the DI (intake)+MPI mode, the flow proceeds to Step Y44 wherein the valve overlap period set in Step Y30 is shortened and the flow proceeds to Step Y60. Otherwise, if the mode is not the DI (intake)+MPI mode either, the flow proceeds to Step Y60. In Step Y60, the control angle $\theta_{VVL}$ and the phase angle $\theta_{VVT}$ for each of the intake valve 27 and the exhaust valve 28 are set, according to the valve overlap period that has been set or changed. Then in Step Y70, information of the control angles $\theta_{VVL}$ and the phase angles $\theta_{VVT}$ is output.

[5. Advantages and Effects]

(1) In the above-described engine control device 1, the valve overlap period is provided by the valve control unit 5, and the calve overlap period is shortened in the DI (intake)+MPI mode of the second rotation speed region. Thus, blow-by of a fuel-air mixture containing fuel supplied from the port injection valve 12 during a valve overlap period can be prevented. This suppresses a reduction in the engine cutout due to a fuel shortage caused by blow-by, and a reduction in the exhaust performance induced by hydrocarbons flowing to the exhaust system.

Additionally, a combination of cylinder and port injections in the period during which the rotation speed Ne is shifting from the first rotation speed region to the second rotation speed region (boundary speed region), provides both the advantage of the cylinder injection and the advantage of the port injection. Specifically, the vaporisation latent heat of the fuel cools down the intake air and the combustion chamber (the intake air cooling effect), and the effect advantageously acts against knocking, resulting in an increased compression ratio. A higher compression ratio increases the volumetric efficiency, which increases the output, resulting in an improved fuel consumption. Additionally, fuel-air mixture with an improved homogeneity can be achieved, which improves the exhaust performance.

Furthermore, the timing of the fuel injection from the port injection valve is advanced in the period during which the rotation speed Ne is shifting frees the first rotation speed region to the second rotation speed region (boundary speed region), blow-by of a fuel-air mixture during the valve overlap period can be further suppressed.

Accordingly, it is possible to make the most use of the advantage of the cylinder injection (i.e., provision of a higher output with the intake air cooling effect) and the advantage of the port injection (i.e., an improved exhaust performance) while suppressing blow-by, enabling both provision of a higher output and provision of an excellent exhaust performance.

(2) In the above-described engine control device 1, the start time $t_p$ of a fuel injection through the port injection valve 12 is advanced further with an increase in the rotation speed Ne. This provides sufficient time for totaling fuel-air mixture, which reduces hydrocarbon emission, resulting an improved exhaust performance. Additionally, by retarding the port injection start time $t_p$ further with a decrease in the rotation speed Ne, blow-by during the valve overlap period can be suppressed. This prevents a reduction in the output and a reduction in the exhaust performance. Particularly, by setting the port injection start time $t_p$ during an intake stroke when the rotation speed Ne is low, blow-by can be suppressed in a reliable manner.

(3) Additionally, in the above-described engine control device 1, the ratio of the port injection amount $F_P$ is increased with an increase in the rotation speed Ne, whereas the ratio of the port injection amount $F_P$ is decreased with a decrease in the rotation speed Ne. At high rotation speeds, fuel can be injected through the cylinder injection valve 11 only for a short period of time, and the amounts of fuel injection may thus be limited. Even in such a case, a higher ratio of the port injection amount $F_P$ ensures that a requested output is satisfied, which suppresses smoke that may be induced by a cylinder injection.

Additionally, at lower rotation speeds, since the ratio of the port injection amount $F_P$ is set smaller, blow-by that may take place during a valve overlaps period can be suppressed. Accordingly, the advantages (improvements in the scavenging effect and the volumetric efficiency) of the provision of the valve overlap period can be achieved. The combination with the turbocharger 30 further enhances the improvements in the scavenging effect and the volumetric efficiency.

(4) The intake air cooling effect of the cylinder injection sharply diminished when the ratio R of the port injection amount $F_P$ to the cylinder injection amount $F_D$ exceeded 1. In the above-described engine control device 1, in contrast, the ratio R of the port injection amount $F_P$ to the cylinder injection amount $F_D$ is kept to 1 or less (1 at maximum) in the high load operating state. Thus, the intake air cooling effect of the cylinder injection is maintained, and the advantage of the cylinder injection can be ensured.

(5) In the above-described engine control device 1, fuel is injected only through the cylinder injection valve 11 in a low rotation speed region of the first rotation speed $Ne_1$ or less, blow-by daring a valve overlap period can be suppressed in a reliable manner. This enables a longer valve overlap period, which enhances the scavenging effect.

(6) In the above-described engine control device 1, in the low and intermediate rotation speed regions of the second rotation speed $Ne_2$ or less (i.e., the first rotation speed region), the separate fuel injections through the cylinder injection valve 11 during an intake stroke and during a compression stroke maximise the intake air cooling effect. The injection during the compression stroke improves combustions, which further enhances the anti-knocking property.

(7) The time available for injecting fuel through a cylinder injector valve 11 in a high rotation speed region was limited, and thus a cylinder injection during a compression stroke might induce smoke. In contrast, in the above-described engine control device 1, limiting timing of a cylinder injection to an intake stroke in the high rotation speed region suppresses smoke. Additionally, a cylinder injection during an intake stroke provides the intake air cooling effect, which further acts against preventing knocking and achieves the advantages of an improved volumetric efficiency and an improved output. An additional port injection ensures provision of the fuel required for the output and improves the homogeneity of a fuel-air mixture.

[6. Modifications]

While the embodiment has been described above, the embodiment may be practiced in a wide variety of modifications, in an extent not departing from the purposes thereof. The elements in the present embodiment may be omitted or selected, if required, or may be suitably combined.

The above-described fuel injection modes described in the embodiment are merely exemplary, and are not limited to those in the map shown in FIG. 4. While a fuel injection mode is selected according to the load P and the rotation speed Ne in the above-described embodiment, the fuel injection mode may be selected according to the rotation speed Ne only, without the load P taken into considerations.

For example, the nodes in the high load region in the map shown in FIG. 4 may also be applied to the low load and the intermediate load. Specifically, in the low rotation speed region, a cylinder injection may be carried out separately during an intake stroke and during a compression stroke. In the intermediate rotation speed region, a cylinder injection may be carried out in separately during an intake stroke and during a compression stroke, and a port injection may be further carried out. Furthermore, in the high rotation speed region, a cylinder injection may be carried out only during an intake stroke, and a pork injection may be carried out during at least an exhaust stroke.

The first rotation speed $Ne_1$ may be omitted, and an operation region less than the second rotation speed $Ne_2$ may be defined as the first rotation speed region and an operation region equal to or greater than the second rotation speed $Ne_2$ may be defined as a second rotation speed region. In other words, it is possible to omit the DI mode. In such a case, it is suffice that the valve overlap period provided in the second rotation speed region is shorter than the valve overlap period provided in the first rotation speed region. Furthermore, a cylinder injection and a port injection may be carried out in any of the rotation speed regions, and the port injection timing in the second rotation speed region may be more advanced.

Additionally, the port injection timing modification unit $3e$ may change the port injection start time $t_p$ according to the rotation speed Ne, when the selected fuel injection mode involves a port injection (i.e., the DI+MPI mode), without the value of the load P taken into considerations. Additionally, the map used by the port injection timing modification unit $3e$ for changing the port injection start time $t_p$ is not limited to the one shown in FIG. 6. Alternatively, a port injection may be carried out at a preset time without changing the port injection start time $t_p$. The timing to carry out the port injection is not limited to an exhaust stroke.

Additionally, a cylinder injection may be carried out only during an intake stroke is the DI+MPI mode, without taking the two steps, or may be carried out separately during an intake stroke and during a compression stroke.

Additionally, while the ratio R of the port injection amount $F_P$ to the cylinder injection amount $F_D$ to is changed when the DI+MPI mode is selected in the high load operating state in the above-described embodiment, the ratio of the port injection amount $F_P$ may be changed according to the rotation speed Ne as long as the operating state is in the high load, irrespective of which mode is selected. On the contrary, the ratio of the port injection amount $F_P$ may be changed according to true rotation speed Ne when the DI+MPI mode is selected, without the loan taken into consideration. Alternatively, the processing to change the ratio of the cylinder injection amount $F_D$ and the port injection amount $F_P$ may be omitted and a preset value may be used instead.

Additionally, while an example has been described in the above-described embodiment where the valve overlap period is provided in the high load state, the valve overlap period may be provided in the intermediate load and/or the low load. Additionally, an example has been described where the valve overlap period is extended in the DI mode, the valve overlap period may be a constant and may not be changed even in the DI mode.

Additionally, while the above-described variable valve actuating mechanism 40 includes the valve lift adjustment mechanism 41 and the valve timing adjustment mechanism 42, it is suffice to provide a mechanism that varies open/close timings of at least one of the intake valve 27 and the exhaust valve 28.

Additionally, while the above-described embodiment has been described wherein a fuel injection mode is selected using a map that includes the load P on the engine 10 and the rotation speed Ne as arguments, maps or calculation formulae for the selection of a fuel injection mode is not limited to this particular example. A fuel injection mode may be selected by using any parameters that correlate with at least the load P on the engine, or any parameters that correlate with the rotation speed Ne.

DESCRIPTIONS OF REFERENCE SYMBOLS

1 Engine control device
2 Engine load calculation unit
3 Injection control unit (injection controller)
3a Total fuel amount calculation unit
3b Injection mode selection unit
3c Ratio modification unit
3d Injection amount setting unit
3e Port injection timing modification unit
3f Injection control signal output unit
4 Supercharging control unit
5 Valve control unit (variable valve controller)
10 Engine
11 Cylinder injection valve
12 Port injection valve
17 Intake port
18 Exhaust port
20 Cylinder
24 Intake passage
27 Intake valve
28 Exhaust valve
29 Exhaust passage
30 Turbocharger (supercharger)
30A Turbine (exhaust turbine)
30B Compressor (intake compressor)
32 Waste gate valve (supercharging pressure adjustment valve)
40 Variable valve actuating mechanism
$Ne_1$ First rotation speed (predetermined rotation speed)

The invention claimed is:

1. An engine control device for an engine provided with a supercharger, the engine including a cylinder injection valve for injecting a fuel into a cylinder in the engine; a port injection valve for injecting the fuel into an intake port of the cylinder; and a variable valve actuating mechanism that varies open/close timing of at least one of an intake valve and an exhaust valve of the engine, the engine control device comprising:

a controller and a memory that stores a program that causes the controller to:

control, as an injection controller, injections of the fuel through the cylinder injection valve and through the port injection valve, on the basis of a rotation speed of the engine; and control, as a variable valve controller, the variable valve actuating mechanism on the basis of the rotation speed, wherein the program causes the controller to provide a valve overlap period for opening both the intake valve and the exhaust valve, in a first rotation speed region, whereas shortening the valve overlap period in a second rotation speed region of greater rotation speeds than in the first rotation speed region, and the program causes the controller to advance timing for injecting the fuel through the port injection valve towards an expansion stroke in the period during which the rotation speed is shifting from the first rotation speed region to the second rotation speed region, for injecting fuel through the cylinder injection valve and through the port injection valve.

2. The engine control device according to claim 1, wherein
the program causes the controller to advance the timing for injecting the fuel through the port injection valve further, as the rotation speed increases.

3. The engine control device according to claim 1, wherein
the program causes the controller to increase a ratio of an amount of the fuel to be injected through the port injection valve, as the rotation speed increases.

4. The engine control device according to claim 2, wherein
the program causes the controller to increase a ratio of an amount of the fuel to be injected through the port injection valve, as the rotation speed increases.

5. The engine control device according to claim 1, wherein
the program causes the controller to set, when causing the fuel to be injected through the port injection valve, a ratio of the amount of the fuel to be injected through the port injection valve to an amount of the fuel to be injected through the cylinder injection valve, to 1 or less.

6. The engine control device according to claim 2, wherein
the program causes the controller to set, when causing the fuel to be injected through the port injection valve, a ratio of the amount of the fuel to be injected through the port injection valve to an amount of the fuel to be injected through the cylinder injection valve, to 1 or less.

7. The engine control device according to claim 3, wherein
the program causes the controller to set, when causing the fuel to be injected through the port injection valve, a ratio of the amount of the fuel to be injected through the port injection valve to an amount of the fuel to be injected through the cylinder injection valve, to 1 or less.

8. The engine control device according to claim 4, wherein
the program causes the controller to set, when causing the fuel to be injected through the port injection valve, a ratio of the amount of the fuel to be injected through the port injection valve to an amount of the fuel to be injected through the cylinder injection valve, to 1 or less.

9. The engine control device according to claim 1, wherein
the program causes the controller to inject the fuel only through the cylinder injection valve, in a low rotation speed region where the rotation speed is within the first rotation speed region and is equal to or smaller than a predetermined rotation speed.

10. The engine control device according to claim 2, wherein
the program causes the controller to inject the fuel only through the cylinder injection valve, in a low rotation speed region where the rotation speed is within the first rotation speed region and is equal to or smaller than a predetermined rotation speed.

11. The engine control device according to claim 3, wherein
the program causes the controller to inject the fuel only through the cylinder injection valve, in a low rotation speed region where the rotation speed is within the first rotation speed region and is equal to or smaller than a predetermined rotation speed.

12. The engine control device according to claim 4, wherein
the program causes the controller to inject the fuel only through the cylinder injection valve, in a low rotation speed region where the rotation speed is within the first rotation speed region and is equal to or smaller than a predetermined rotation speed.

13. The engine control device according to claim 5, wherein
the program causes the controller to inject the fuel only through the cylinder injection valve, in a low rotation speed region where the rotation speed is within the first rotation speed region and is equal to or smaller than a predetermined rotation speed.

14. The engine control device according to claim 6, wherein
the program causes the controller to inject the fuel only through the cylinder injection valve, in a low rotation speed region where the rotation speed is within the first rotation speed region and is equal to or smaller than a predetermined rotation speed.

15. The engine control device according to claim 7, wherein
the program causes the controller to inject the fuel only through the cylinder injection valve, in a low rotation speed region where the rotation speed is within the first rotation speed region and is equal to or smaller than a predetermined rotation speed.

16. The engine control device according to claim 8, wherein
the program causes the controller to inject the fuel only through the cylinder injection valve, in a low rotation speed region where the rotation speed is within the first rotation speed region and is equal to or smaller than a predetermined rotation speed.

17. The engine control device according to claim 1, wherein
in the first rotation speed region, the program causes the controller to inject the fuel through the cylinder injection valve separately during an intake stroke and during a compression stroke.

18. The engine control device according to claim 1, wherein
the engine provided with the supercharger that comprises:
an exhaust turbine that is provided in an exhaust path of the engine, and is rotatable by an exhaust stream;
an intake compressor that is provided in an intake path of the engine, and is rotatable with a rotation of the exhaust turbine by being coupled to the exhaust turbine; and
a supercharging pressure adjustment valve that is provided in the exhaust path, and is switchable between a closed state to supply the exhaust stream to the exhaust turbine, and an open state to exhaust the exhaust stream, bypassing the exhaust turbine, and
when the supercharging pressure adjustment valve is in the closed state,
the program causes the controller to provide the valve overlap period for opening both the intake valve and the exhaust valve in the first rotation speed region, whereas shortening the valve overlap period in the second rotation speed region of greater rotation speeds than in the first rotation speed region, and the program causes the controller to advance timing for injecting the fuel through the port injection valve towards an expansion stroke in the period during which the rotation speed is shifting from the first rotation speed region to the second rotation speed region, for injecting fuel through the cylinder injection valve and through the port injection valve.

* * * * *